Oct. 15, 1935.  A. A. QUICK  2,017,352
WINCH AND LIKE HOISTING APPARATUS
Filed Aug. 28, 1934   4 Sheets-Sheet 1
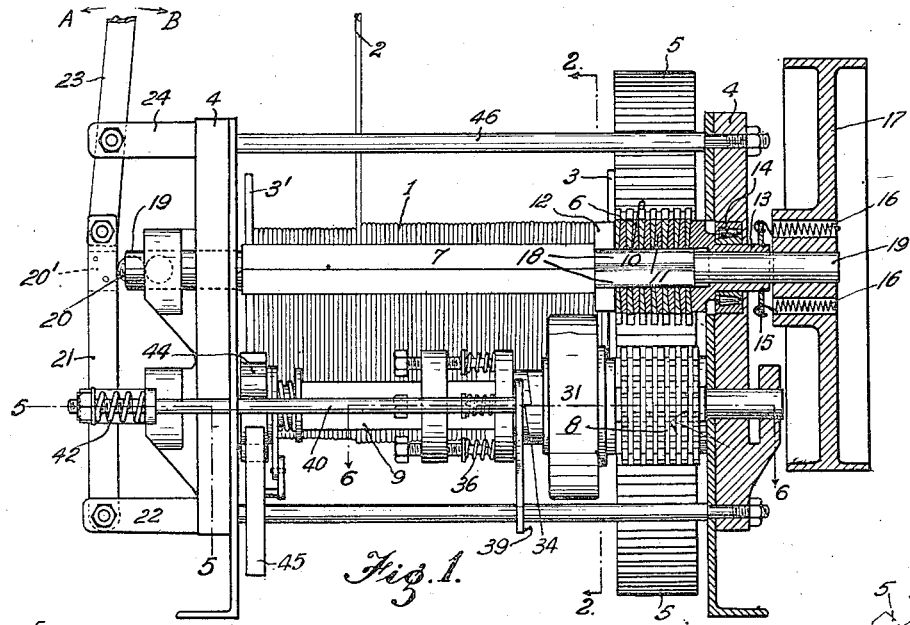
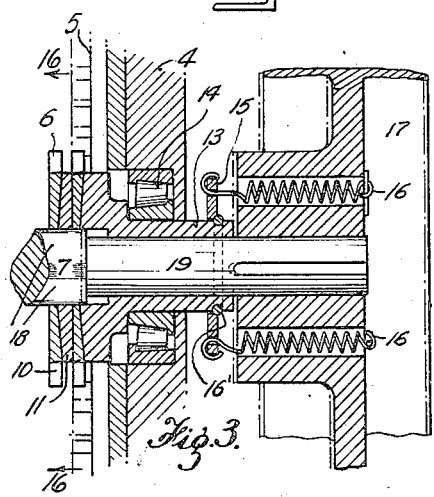
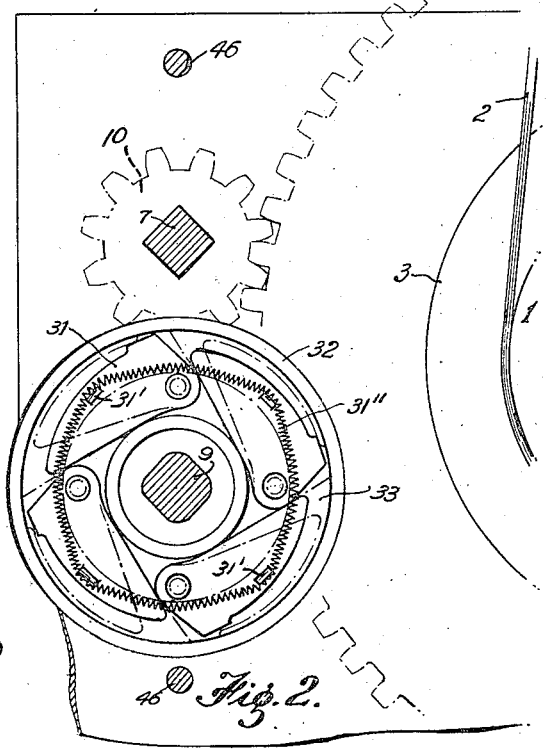
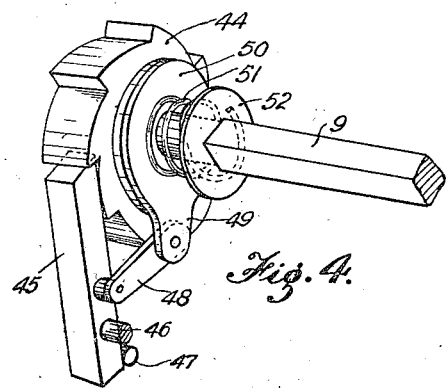
A. A. Quick
INVENTOR
By: Marks & Clerk
Attys.

Oct. 15, 1935.  A. A. QUICK  2,017,352
WINCH AND LIKE HOISTING APPARATUS
Filed Aug. 28, 1934  4 Sheets-Sheet 2
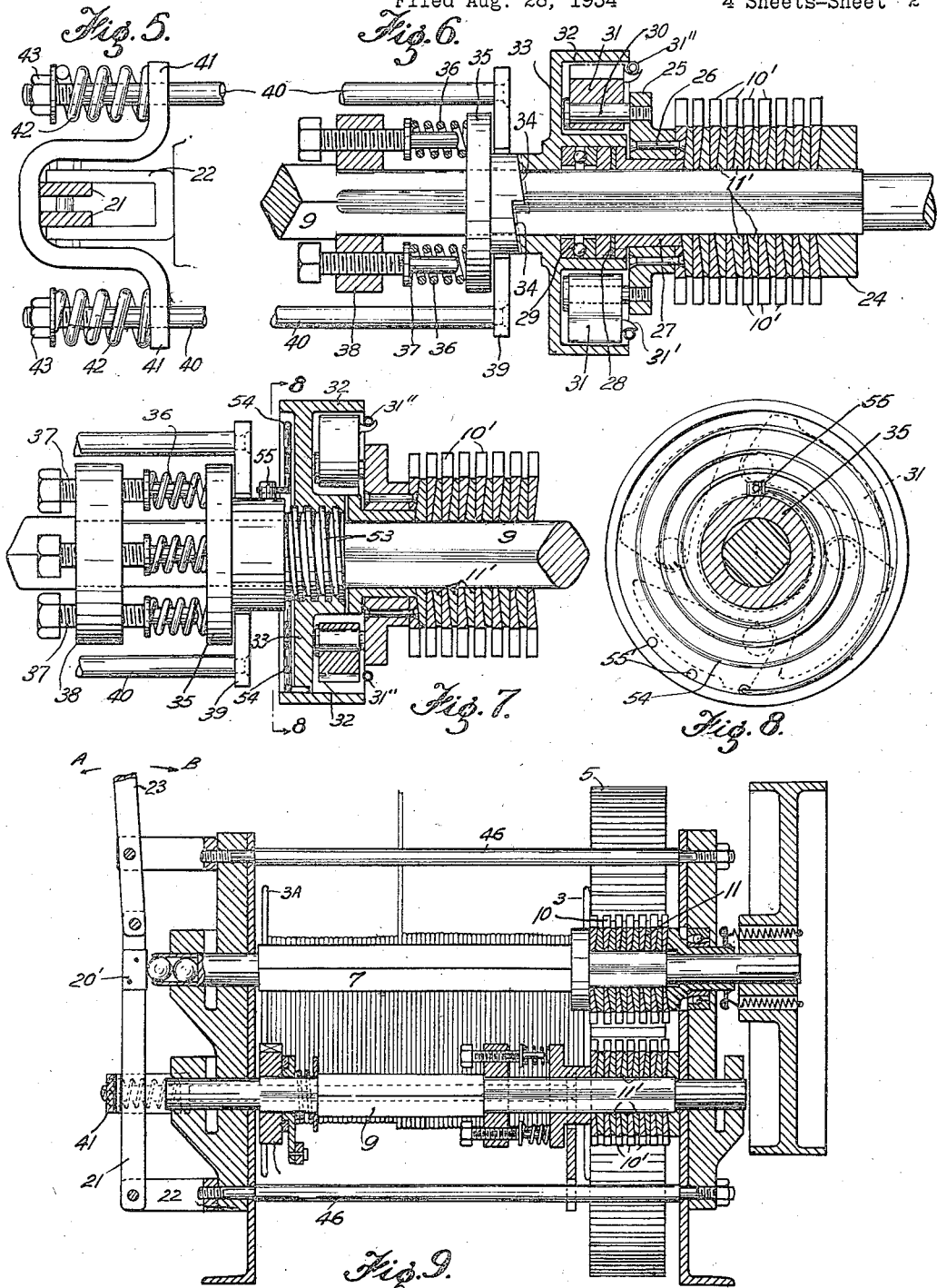

Oct. 15, 1935.  A. A. QUICK  2,017,352
WINCH AND LIKE HOISTING APPARATUS
Filed Aug. 28, 1934  4 Sheets-Sheet 3
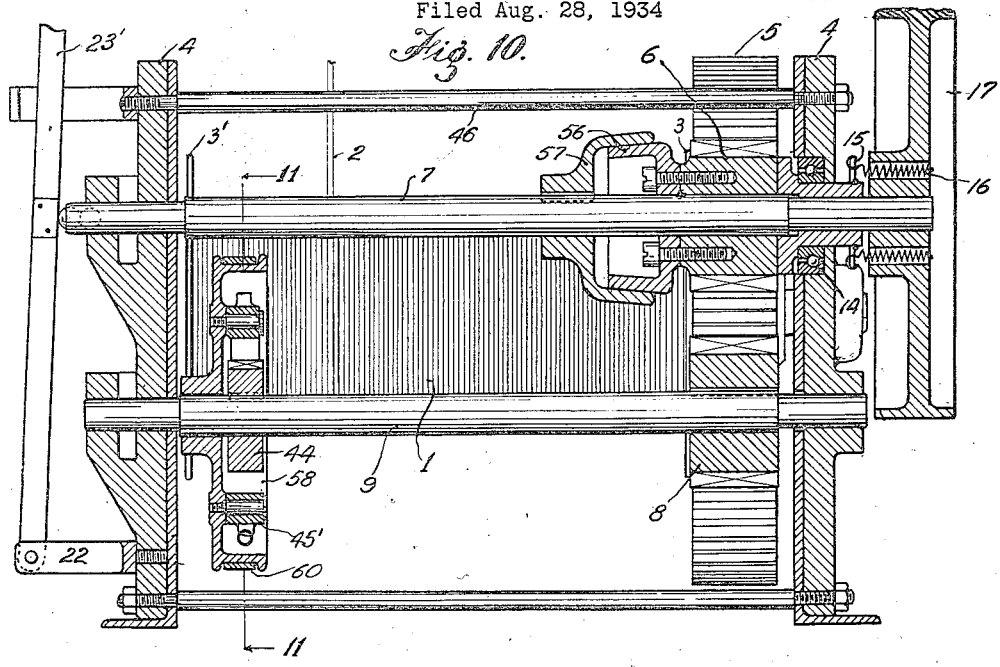
Fig. 10.
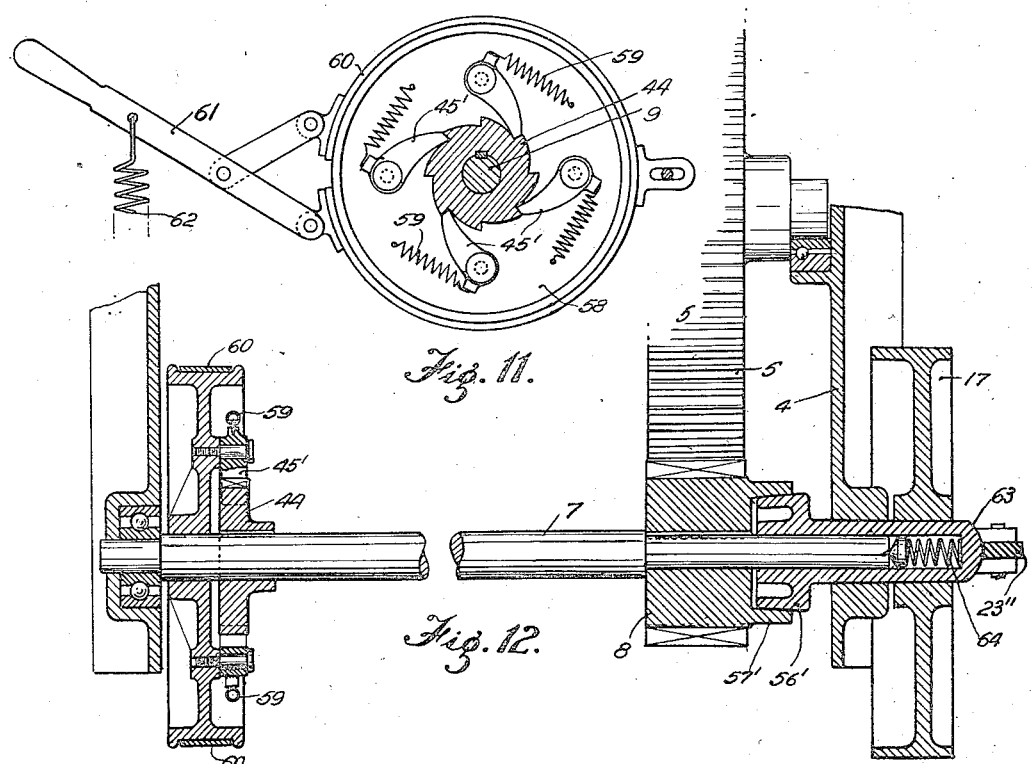
Fig. 11.
Fig. 12.
A. A. Quick
INVENTOR
By Marks & Clerk
ATTYS.

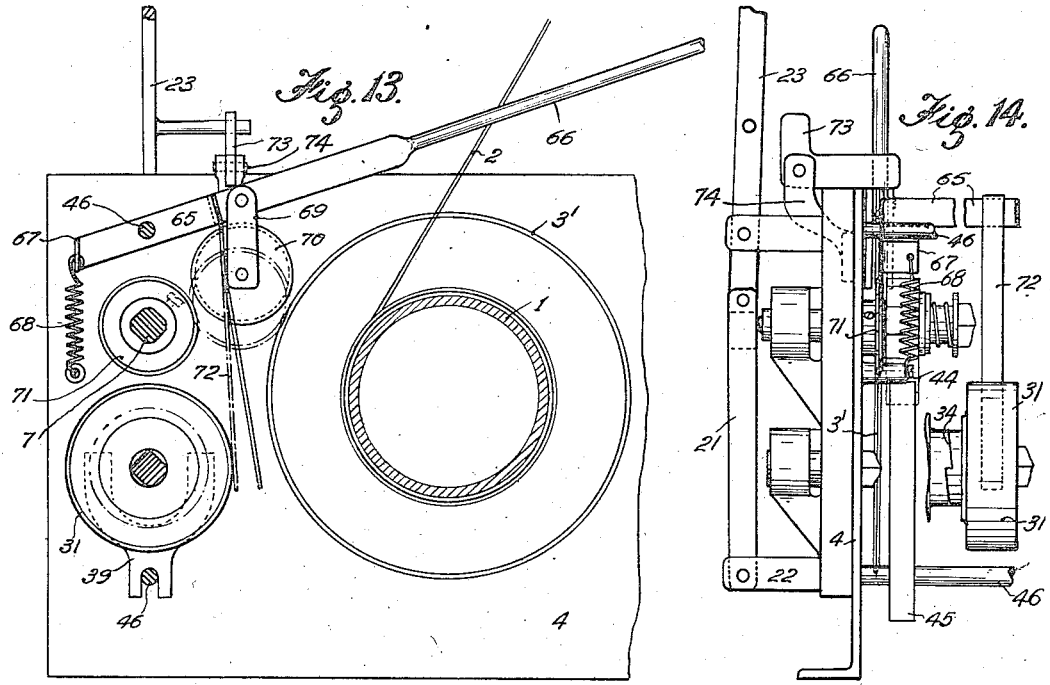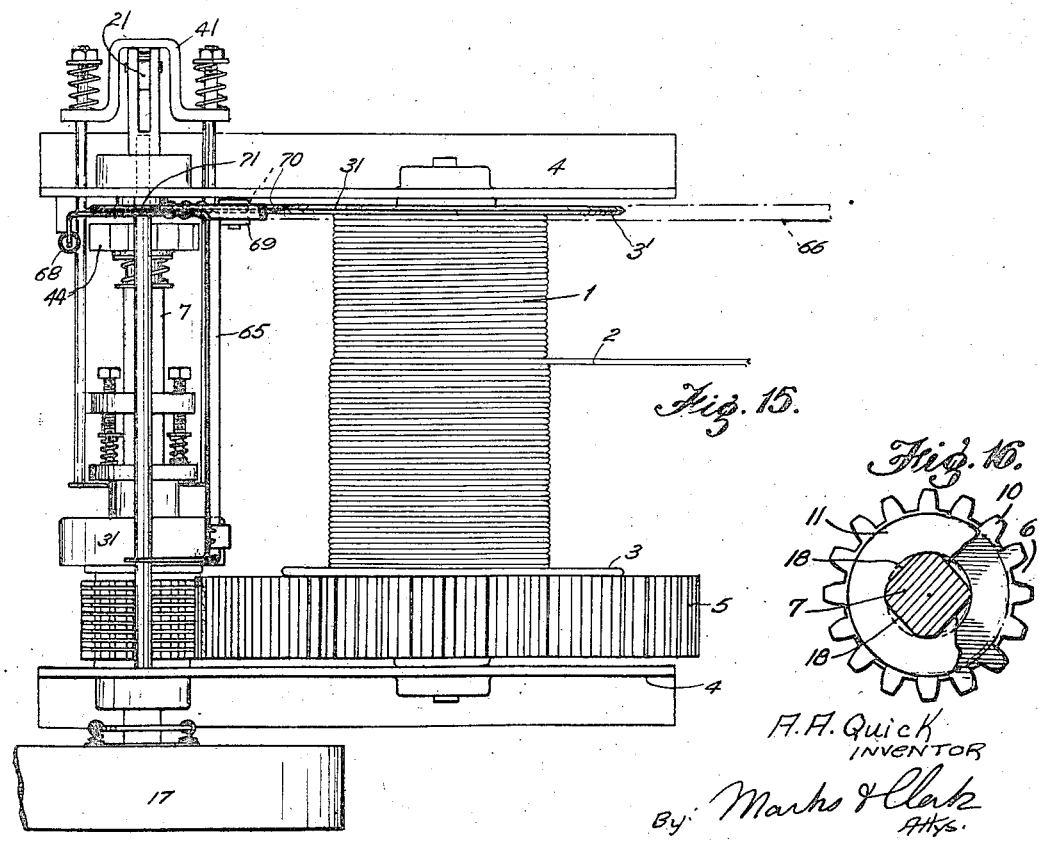

Patented Oct. 15, 1935

2,017,352

UNITED STATES PATENT OFFICE 2,017,352

WINCH AND LIKE HOISTING APPARATUS

Alfred Arthur Quick, Thornbury, Victoria, Australia

Application August 28, 1934, Serial No. 741,836
In Australia September 8, 1933

20 Claims. (Cl. 254—187)

This invention relates to improvements in winches and like hoisting and hauling apparatus and refers especially to apparatus wherein a winding drum or similar member having a hoisting or hauling rope wound thereon is driven by toothed gearing and controlled by clutch mechanism whereby a load attached to the free end of the rope can be moved or raised and lowered.

The object of the invention is to provide simple, durable and thoroughly efficient mechanism for enabling the movement or rotation of the gearing of winches or hoisting apparatus to be easily and safely controlled whereby a hauling strain can be applied to a member supporting a load and the load of strain can be lowered or released at a desired rate and be automatically stopped without shock or jar should the operator, either by accident or design, suddenly release the control member.

I accomplish the abovementioned object by providing a winding apparatus such as a winch or hoist with a winding drum or barrel having a spur gear wheel fitted thereto or mounted thereon, a pinion in geared relationship with the spur gear wheel and having frictional clutch means for operatively connecting it to a driving member to impart motion to the winding drum, pawl and ratchet mechanism and a friction brake arranged in series for normally preventing reversing or unwinding movement of the drum, and means for releasing the friction brake to permit of a controlled reversing movement of the winding drum when the friction clutch is disengaged.

The pinion and friction clutch may be combined in the form of a flexible pinion having a series of toothed discs free to rotate and move longitudinally on a supporting shaft and a series of friction discs interposed alternately between the toothed discs, said friction discs being free to move longitudinally on the shaft but constrained to rotate therewith and means for applying end pressure on the assemblage of discs to cause the toothed discs to be engaged by the friction discs and rotate with the shaft to impart motion to the winding drum.

The friction brake may be in the form of a flexible pinion constructed of an assemblage of toothed and friction discs as above described and mounted on a second shaft and having means for normally maintaining the discs in frictional engagement and for controllably releasing the same to permit of the reverse or unwinding movement of the drum while the pawl and ratchet mechanism arranged in series therewith is holding the second shaft against rotation.

The reverse movement of the winding drum can be controlled automatically by centrifugally operable members carried on a member fixedly associated with one or more of the toothed discs and adapted to frictionally engage a member freely mounted on the shaft and capable upon rotation of longitudinal movement thereon to apply varying end pressure to the assemblage of discs, the end pressure being proportional to the speed of the unwinding movement of the drum.

The pinion, friction clutch, pawl and ratchet mechanism and friction brake can be mounted on a single shaft and the brake may comprise a drum having a flexible band normally bearing thereon and provided with manually controlled means for releasing the same.

A winch or hoisting apparatus embodying the above and other essential features of the invention is fully described in the following specification and illustrated in the accompanying sheets of explanatory drawings wherein:

Figure 1 is a view in rear elevation, partly in section, of a winch or hoisting apparatus constructed in accordance with the present invention.

Figure 2 is a view in sectional end elevation taken on the dotted line 2—2 of Figure 1.

Figure 3 is a view showing part of Figure 1 drawn to a larger scale and hereinafter will be fully described.

Figure 4 is a view in perspective of the pawl and ratchet retaining mechanism embodied in the winch or hoisting apparatus shown in Figure 1.

Figure 5 is a view in sectional plan taken on the dotted line 5—5 of Figure 1.

Figure 6 is a view in sectional plan taken on the dotted line 6—6 of Figure 1.

Figure 7 is a view in sectional plan showing a slight modification of that part of the invention shown in Figure 6.

Figure 8 is a view in sectional end elevation taken on the dotted line 8—8 of Figure 7.

Figure 9 is a view in sectional rear elevation of a modified form of winch constructed in accordance with the invention.

Figure 10 is a view in sectional rear elevation showing another modification of the invention.

Figure 11 is a view in sectional end elevation taken on the dotted line 11—11 of Figure 10.

Figure 12 is a view in sectional plan showing a further slight modification of the invention and hereinafter will be fully described.

Figure 13 is a view in sectional end elevation of part of a winch and illustrates a further modification which hereinafter will be fully described.

Figure 14 is a view in rear elevation of one end of a winch and shows the modification illustrated in Figure 13.

Figure 15 is a view in plan of the apparatus shown in Figure 13.

Figure 16 is a view in sectional side elevation taken on the dotted line 16—16 of Figure 3, part being shown broken away for convenience of illustration.

In these drawings like characters of reference are employed to indicate the same or corresponding parts throughout the different views and the numeral 1 designates a winding drum adapted to accommodate a hauling rope 2 and having end flanges 3 and 3'. The winding drum 1 is rotatively mounted at both ends in the frame 4 of the winch in any approved way.

A spur gear wheel 5 is attached to one end of the winding drum 1 and the teeth thereof mesh with the teeth of a combined friction clutch and pinion 6 supported upon a shaft 7 rotatively mounted at its ends in the frame 4. For the sake of convenience this shaft will hereinafter be referred to as "the first shaft".

The combined brake and pinion 8 is mounted on a second shaft 9 supported at its ends in the frame 4 and this pinion also meshes with the spur gear wheel 5.

The combined friction clutch and pinion 6 comprises a series of alternately arranged toothed discs 10 and friction discs 11, the toothed discs being free to rotate on the shaft 7 and the friction discs being mounted slidably but non-rotatively on the said shaft. The diameter of the friction discs 11 is less than the diameter of the portions of the toothed discs between the roots of the teeth thereon and both sets of discs are free to slide longitudinally on the shaft 7.

The assemblage of toothed and friction discs are mounted between a collar 12 and a flange on the inner end of a sleeve 13 mounted on the shaft 7.

The outer face of the flange on the sleeve 13 bears against an antifrictional bearing 14 mounted in one end of the frame 4 and the outer end of the said sleeve supports a detachable disc 15 which is connected by tension springs 16 to a driving pulley 17 keyed to the shaft. The disc 15 is retained on the outer end of the sleeve 13 by an open spring ring 16' which is accommodated in a groove formed circumferentially in the sleeve.

The shaft 7 may be square in cross section and the portion accommodating the collar 12 and discs 10 and 11 can be turned down to leave four flat sides 18 (see Figures 1 and 16) whereby when the centres of the friction discs 11 are correspondingly shaped they will be free to slide endwise but will not rotate independently of the said shaft.

In Figure 16 the centres of the toothed discs are shown provided with circular holes of sufficient diameter to permit the said discs normally to rotate freely on the shaft 7 and the centres of the alternately arranged friction discs are shown provided with holes which correspond in shape with but are slightly larger than the cross section of the part of the shaft 7 carrying the assemblage of discs.

The end portions of the shaft 7 are rounded to form journals 19, the journal at one end being rotatively mounted in a bearing on one end of the frame and the opposite journal passing through and rotating with the sleeve in the antifrictional bearing 14.

The end of the shaft 7 opposite to that provided with the pulley 17 is bored axially to accommodate a hardened steel ball 20 which is adapted to take the thrust of a block 20' on links 21 pivoted at their lower ends to a bracket 22 on the frame, and pivotally connected at their upper ends to a control lever 23 which is supported by a bracket 24 on the upper part of the frame. It will be understood that the thrust of the links 21 upon the end of the shaft will be resisted by the tension of the springs 16 and that when the thrust is removed the springs will cause the shaft to be restored to its normal position.

Thus when the lever 23 is moved in the direction of the arrow A the inward thrust on the shaft will cause the discs 10 and 11 to be pressed firmly together between the collar 12 and flange on the sleeve 13 and the frictional engagement between the said discs will cause them to rotate with the shaft and impart rotation to the spur gear wheel 5 and the winding drum.

The combined friction brake and pinion 8 on the second shaft 9 is constructed of series of alternately arranged toothed discs 10' and friction discs 11' formed in the same way as those constituting the combined friction clutch and pinion 6 on the shaft 7.

Figure 6 clearly shows the construction and arrangement of the combined friction brake and pinion and parts associated therewith.

The assemblage of discs 10' and 11' are mounted on the shaft 9 between a fixed collar 24 and a flanged thrust collar 25 which may be attached by rivets 26 or otherwise to the inner toothed disc 10'.

The thrust collar is rotatively supported about a sleeve 27 which is carried by the shaft 9 and a separating ring 28 slidably but non-rotatively mounted on the said shaft is located between the sleeve and a thrust bearing 29.

The flange on the adjustable thrust collar 25 is adapted to carry a series of pins 30 pivotally supporting friction blocks 31 the free ends of which are adapted to swing outward under centrifugal force and frictionally engage the internal face of an annular constraining flange 32 on a member 33 slidably and rotatively mounted on the shaft.

The outer faces of the pivoted friction blocks 31 are provided with projecting lugs 31' adapted to support a flexible band 31" of helically coiled wire and the tension of this band serves normally to retain the free ends of the pivoted friction blocks away from the inner periphery of the flange 32 on the member 33.

The outer end of a boss on the member 33 is formed with inclined clutch teeth 34 which mesh with correspondingly shaped clutch teeth on a collar 35 slidably mounted on the shaft.

The collar 35 normally is maintained thrust toward the member carrying the pivoted friction blocks by a series of compression springs 36 mounted on the reduced ends of screwed pins 37 which are carried by a collar 38 fitted to the shaft.

The screws 37 can be adjusted to vary the pressure exerted by the springs 36 whereby the normal frictional engagement between the contiguous faces of the discs 10' and 11' can be adjusted as required.

A fork 39 loosely engages the thrust collar 35 and this fork is connected by rods 40 to a yoke 41 adapted to pass around the outside of the links 21 connected to the control lever 23.

The outer ends of the rods 40 can be fitted with compression springs 42 which are located between the ends of the yoke 41 and nuts 43 on the ends of the said rods.

A ratchet wheel 44 is fixedly mounted on the shaft 9 and a retaining pawl 45 pivotally mounted on the frame is adapted to engage therewith and prevent reverse movement of the said shaft when the discs 10' and 11' are moved out of engagement and the winding drum is rotated in a direction to unwind the rope 2 therefrom.

The pawl 45 can be mounted on one of the cross bars 46 of the frame and an abutment 47 on the said frame will limit the movement of the pawl when moving into its disengaged position. The engaging end of the pawl 45 can be connected by a link 48 to an arm 49 on a friction disc 50 which is forced to bear against the face of the ratchet by a compression spring 51 bearing at its opposite end against a collar 52 on the shaft 9.

The arm 49 and link 48 are arranged so that as the shaft 9 is rotated during the winding operation of the drum 1 the frictional contact between the disc 50 and the side of the ratchet 44 will cause the toggle, formed by the link 48 and arm 49, to straighten out and thereby maintain the engaging end of the pawl out of engagement with the ratchet and obviate the clicking noise ordinarily associated with the idle movement of pawl and ratchet mechanism.

In describing the operation of the form of the invention shown in Figures 1 to 6 of the drawings it will be assumed that one end of the rope 2 is wound upon the winding drum and the other end is attached to a load to be lifted and also that the pulley and shaft 7 are being constantly driven by belt and pulley gearing from any suitable source of power.

Normally the assemblage of discs forming the combined friction clutch and pinion are retained out of engagement by the inward thrust on the shaft 7 by the springs 16 and the shaft 7 will rotate without imparting motion to the spur wheel gear 5.

The assemblage of discs forming the combined friction brake and pinion are normally pressed together by the springs 36 and will rotate in unison with the shaft 7 when motion is imparted to the spur gear wheel to wind the rope on the drum.

In order to raise the load the operator moves the control lever 23 in the direction indicated by the arrow A thereby causing an endwise thrust to be applied to the shaft 7 and the toothed discs 10 to be frictionally engaged by the discs 11 with sufficient pressure to cause them to rotate therewith and impart motion to the spur wheel gear and winding drum. When the winding drum is rotated as above described to raise the load on the free end of the rope 2 the ratchet wheel 44 rotates with the second shaft and the pawl 45 will be held in its idle position.

When the load has been raised to a desired height the operator releases the control lever 23 and it will be returned to its normal position by the inward thrust of the springs 16 and the thrust of the said springs will also move the toothed discs 10 and friction discs 11 apart thereby permitting the shaft 7 to run free.

The pull exerted by the load would now tend to cause a reversal of rotation of the winding drum and the spur gear wheel but this is prevented by the pawl 45 moving into engagement with the ratchet wheel and the fact that the assemblage of discs constituting the combined friction brake and pinion are in fixed relationship to the second shaft 9.

When it is desired to lower the load the operator moves the control lever 23 in the direction indicated by the arrow B thereby causing the links 5 and 21 to be moved outward against the yoke 41 and exert a pull on the rods 40. The movement thus imparted to the rods and the fork 39 causes the springs 36 to be compressed and thereby release the frictional engagement between the discs 10' and 11' of the combined friction brake and pinion.

The springs 42 normally do not exert any end thrust on the rods 40 and the springs 36 are not compressed to release frictional engagement between the discs 10' and 11' until the load on the springs 42, due to the movement of the links 21, is greater than the normal pressure or load on the springs 36.

When the frictional engagement between the discs 10' and 11' is released as above described the pull on the rope will cause a reversal of rotation of the winding drum 1 and spur gear wheel 5. To arrest the descent of the load the pressure on the lever 23 is released when the springs 36 will cause the discs 10' and 11' to be placed in frictional engagement and the pawl and ratchet retaining device on the second shaft then takes the reaction and prevents further reverse rotation of the winding drum and gears.

Meanwhile the constantly rotating pulley 17 is driving the first shaft but as the discs of the combined friction clutch and pinion are out of engagement the toothed discs 10 will not transmit any power but will idly follow any reverse rotation of the spur gear wheel.

Should the descent of the load be sufficiently rapid to cause the pivoted friction blocks 31 to swing outwardly to engage the inner periphery of the annular constraining flange 32 the frictional engagement set up between these parts will impart a partial rotation to the member 33 on the second shaft. When a partial rotation is imparted to the member 33 the shape of the clutch teeth 34 will cause it to be moved longitudinally on the second shaft to place the discs 10' and 11' in frictional engagement and thereby arrest or retard the rotation of the said shaft in proportion to the speed of rotation of the winding drum.

The pivoted friction blocks being normally retained in their inoperative position by the encircling elastic band 31'' do not move outward and engage the flange 32 of the member 33 until the latter is rotated with sufficient speed to cause centrifugal force to overcome the constraining action of the said elastic band 31'' holding the pivoted friction blocks in their innermost positions.

The member 33 is mounted to move freely on the second shaft when the thrust of the springs 36 is removed therefrom and it is readily responsive to the action of the pivoted friction blocks when the thrust collar is rotated rapidly by the inner toothed disc 10' connected thereto.

It will be readily understood from the foregoing description that the pivoted friction blocks can be constructed and arranged so that the combined friction brake and pinion can be automatically controlled to ensure the load being lowered at a predetermined rate of speed.

The springs 42 on the rods 40 enable a yielding thrust to be imparted to the latter when the lever 23 is operated in a direction to lower a load. This yielding thrust enables a more flexible control of the lowering operation to be effected.

In lieu of providing inclined faces between the member 33 and the collar 35 to effect a longitudinal displacement of the said member 33 when it is rotated by the pivoted friction blocks 31 engaging the flange 32 thereon, a threaded engagement can be formed between the parts as shown in Figure 7 of the drawings.

In this view the bore of the member 33 is provided with an internal thread which is engaged by a thread 53 externally on a reduced part of the collar 35. The pitch and direction of the thread is such that a desired movement is imparted to the member 33 when the pivoted friction blocks 31 engage with the flange thereon during the lowering of the load.

The rotational movement of the member 33 due to the frictional engagement between the pivoted blocks 31 and the flange 32 may be opposed to the stress of a spiral spring 54 having one end anchored at 55 to the collar 35 and the other end adjustably connected to the said member, see Figures 7 and 8 of the drawings. The spring 54 ensures the prompt return of the member 33 to its normal position, and the end pressure on the discs 10' and 11' to be removed, when the descent of the load is slower than that desired. The normal tension of the spring 54 can be adjusted by placing its outer end in engagement with any one of a series of holes 55' provided in the member 33.

In the form of the invention shown in Figure 9 of the drawings the flanged thrust collar 25, pivoted friction blocks 31 and member 33 are dispensed with and the collar 35 is arranged to bear directly upon the inner toothed disc 10'. In this construction the descent of the load is manually controlled by the operation of the lever 23 and in other respects the winch is operated as above described.

In the modification of the invention shown in Figure 10 of the drawings the pinion 6 is made solid and provided with an internal clutch member 56 of the cone type. The external clutch member 57 is keyed to the shaft 7 so that when the said shaft is thrust endwise by the control lever 23' the two members of the clutch will be placed in frictional engagement with each other, and the winding drum will be rotated to raise a load attached to the rope 2.

The pinion 8 on the second shaft 9 is also solid and the teeth of the retaining ratchet 44 are engaged by pawls 45' pivoted to a brake drum 58 rotatively mounted on the shaft adjacent to the said ratchet. The pawls 45' can be provided with springs 59 which are arranged to maintain them bearing constantly on the periphery of the ratchet and ensure their positive engagement with the teeth thereof when the shaft is rotated in a reverse direction.

A brake band 60 anchored on the frame of the winch encircles the brake drum 58 and the open ends of the said band are connected to an operating lever 61.

The ratchet and pawls are so arranged that when the drum 58 is locked against rotation by the brake band the pawls will engage with the teeth of the ratchet and prevent rotation of the shaft 9, pinion 8 and winding drum in a reverse or unwinding direction.

When the rope is being wound on the winding drum the shaft 9 will be rotated in a direction which will cause the pawls to ride freely over the teeth of the ratchet.

A spring 62 is arranged to exert a pressure on the lever 61 in a direction which will maintain the brake band pressed sufficiently hard upon the drum 58 to prevent any reversal movement of the winding drum under the influence of a load when the clutch members 56 and 57 are disengaged.

When it is desired to lower a load the lever 61 is moved in a direction opposite to the pressure exerted by the spring 62 to free the brake band when the shaft 9 will be more or less free to rotate and permit the winding drum to move in a reverse direction to that in raising the load.

By a careful manipulation of the lever 61 an operator can lower the load as desired and if for any reason the lever is released the spring 62 will take instant control and apply the brake band with sufficient force to stop the further descent of the load.

In the modification of the invention shown in Figure 12 of the drawings the combined pinion and friction clutch and the combined ratchet and brake mechanism are arranged on a single shaft.

In the form of construction shown the male member 56' of the clutch is mounted on a sleeve 63 fitting over the end of a shaft 7 and rotatively mounted in the frame 4 of the apparatus.

The sleeve 63 is provided with a pulley 17 which is adapted to be driven from any suitable source of power.

The outer end of the sleeve 63 is closed and a compression spring 64 is located between the outer end of the sleeve and the adjacent end of the shaft to ensure a constant outward thrust on the sleeve. The outward thrust of the spring 64 is sufficient to cause the male member 56' of the clutch to be normally retained out of engagement with the female member 57' on the outer end of the pinion 6 which is rigidly secured to the shaft.

The two members of the cone clutch are adapted to be placed in engagement to cause a winding movement to be imparted to the drum 1 by exerting an inward thrust on the sleeve 63 by means of a lever 23" or other approved device.

The shaft 7 at an approved point in its length is provided with a combined pawl and ratchet and brake mechanism of the type shown in Figure 11 of the drawings.

The brake and pawl and ratchet mechanism normally will prevent the rotation of the shaft 7 in a direction which will permit the reverse movement of the winding drum. To raise a load an inward thrust is applied to the sleeve 63 by the lever 23" to place the clutch member 56' in frictional engagement with the driven member 57' when the pinion will impart rotation to the spur wheel gear 5 to wind the rope on the drum. During the raising of the load the ratchet wheel 44 will rotate with the shaft and the pawls 45 will click idly over the teeth thereof.

When the load has been raised a desired height the lever is released and the pawls 45 will engage the teeth of the ratchet 44 and prevent the winding drum moving in a reverse direction under the influence of the load.

When the friction clutch is released the brake lever 61 can be manipulated to permit the load to descend as hereinbefore described.

A winch or hoist constructed in accordance with the invention may be provided with mechanism the operation of which will facilitate the rotation of the drum in reverse direction to lower a hook, grab or like member attached to the free end of a hauling rope.

When the hook is not sufficiently heavy to cause the winding drum to rotate in a reverse direction or to be rotated with sufficient speed the above mentioned mechanism can be brought into operation to cause the drum to be reversed rapidly.

The reversing mechanism may comprise a yoke shaped member 65 pivotally supported on a cross bar 46 connecting the sides of the frame and located above the shaft 7. This yoke shaped member can be provided with a forwardly extending lever 66 and with a rearward extension 67 which is connected by a spring 68 to a part of the frame therebelow whereby the lever will be normally retained in a raised position.

The lever 66 is provided with depending arms or links 69 between the lower ends of which is rotatively supported a narrow grooved friction wheel 70. The friction wheel 70 is arranged in line with the flange 3' on the end of the winding drum and the edge of the flange is shaped to correspond with the tapered groove in the said friction wheel.

A narrow friction wheel 71 having an oppositely tapered edge conforming to the groove in the friction wheel 70 is fitted to the shaft 7 in such a position that when the lever 66 is lowered the wheel 70 may be placed in frictional engagement therewith and with the flange 3' on the winding drum.

A spring finger 72 is fitted to and depends from the yoke 65 pivoted to the cross bar and the lower end of the said finger is located adjacent to the periphery of the flange 32 of the reverse speed controlling device on the shaft 9.

When it is desired to cause the winding drum to move in a reverse direction the operator moves the control lever 23 in the direction of the arrow B thereby releasing the frictional engagement between the discs 10' and 11'.

The pulley and belt gearing will now cause the shaft 7 to be rotated and when the lever 66 is depressed to cause the friction wheel 70 to engage with the friction wheel 71 and the flange 3' on the winding drum a reverse movement will be imparted to the said drum.

The depression of the lever 66 will cause the spring finger to contact with the periphery of the flange 32 on the reverse speed controlling device and prevents the rotation of the member carrying the said flange and consequently any longitudinal movement of the same on the shaft which would be liable to cause the discs 10' and 11' to be brought into frictional engagement.

In a modification of the reversing device the lever 66 may be dispensed with and the device may be actuated from the control lever 23.

In this form of construction a bell crank 73 is pivotally mounted on a bracket 74 fitted to the frame with one arm extending upwardly and the other arm extending inwardly across the yoke shaped member 65 pivotally carried by the cross bar 46.

The bell crank 73 is so arranged that when the control lever has been moved inwardly beyond a distance sufficient to release the frictional engagement between the discs 10' and 11' it will contact with the upwardly projecting arm of the bell crank and the further movement of the lever 23 will cause the bell crank to be actuated to cause the inwardly projecting arm to bear upon and depress the yoke shaped member 65 and thereby cause the grooved wheel 70 to be brought into frictional contact with the flange 3' on the winding drum and the friction wheel 71 non-rotatively mounted on the shaft 7.

From the foregoing description of the invention it will be seen that two friction coupling devices are employed, one of which is normally free from frictional engagement whilst the other is normally in full engagement and that when the former is in engagement a load may be raised and when both are released the load is allowed to descend.

An apparatus constructed in accordance with the invention can be used for a variety of purposes such for instance, as raising and lowering heavy articles, hauling trucks, handling logs in a mill and the like.

An important feature lies in the fact that the winch, whether hoisting or lowering, automatically locks the load against further movement and the load therefore cannot accidentally crash should the operator, either by accident or design, suddenly release the control lever or if the belt should break or slip off the driving pulley. Thus in any emergency the operator may instantly leave his post with a feeling of confidence that the apparatus will immediately stop and securely hold the load.

Whilst I have described certain practical applications of the invention I am aware that various modifications and alterations can be made in the construction and arrangement of the parts without departing from the spirit and scope of the same, and, I, therefore do not wish to be understood as limiting myself by the positive terms employed in the description, excepting such as the state of the art may require.

I claim:

1. In winches and hoisting apparatus having a winding drum provided with a spur gear wheel, a combined flexible pinion and friction clutch in geared relationship with the spur wheel, means for placing the combined pinion and friction clutch in fixed relationship with a driving member to impart movement to the winding drum, a combined flexible pinion and friction brake in geared relationship with the spur gear wheel, pawl and ratchet mechanism for normally preventing rotation of the combined flexible pinion and brake, and means for releasing the frictional engagement between the elements of the combined flexible pinion and brake to permit of the reverse movement of the winding drum.

2. In winches and hoisting apparatus having a winding drum provided with a spur gear wheel, a pinion in geared relationship with the spur gear wheel, a friction clutch, lever control means for actuating the clutch to place the pinion in fixed relationship with a power driven member to impart winding motion to the drum, means for automatically releasing the friction clutch when the lever control means are released, ratchet mechanism and a friction brake on a shaft in geared relationship with the winding drum for normally preventing reverse movement being imparted thereto, lever control means for releasing the friction brake to permit a reverse movement of the winding drum, and centrifugally actuated mechanism for controlling the operation of the friction brake during the reverse movement of the winding drum.

3. In winches and hoisting apparatus having a winding drum provided with a spur gear wheel, a flexible pinion in geared relationship with the spur gear wheel, a driving shaft supporting the flexible pinion, means for placing the toothed elements of the flexible pinion in fixed relationship with the driving shaft whereby rotation may be imparted to the winding drum, pawl and ratchet mechanism and a friction brake for normally preventing reverse movement of the winding drum, lever controlled means for releasing the friction brake, a collar mounted on the shaft, centrifugally operated friction blocks on the collar, a member slidably and partially rotatable on the shaft carrying the second flexible pinion, an annular ring on the shaft constraining the movement of the pivoted friction blocks, a thrust collar on the shaft, and inclined bearing faces on the outer end of the partially rotatable member bearing against inclined faces on the thrust collar.

4. In winches and hoisting apparatus according to claim 3, an elastic member or members adapted to act upon the free ends of the centrifugally operated friction blocks to yieldingly retain the same in their inoperative positions.

5. In winches and hoisting apparatus according to claim 3, a friction wheel on the driving shaft and arranged in line with an end flange on the winding drum, a friction wheel mounted on a movable member and interposed between the first mentioned friction wheel and the flange on the winding drum, and a flexible finger fitted to the movable support for the second friction wheel and adapted to bear against the annular constraining ring when the second friction wheel is placed in engagement with the friction wheel on the shaft and flange on the drum to impart reverse rotation to the said drum.

6. A winch or hoisting apparatus comprising a winding drum provided with a spur gear wheel, a flexible pinion mounted upon a driven shaft and meshing with the spur gear wheel, the elements of said flexible pinion being normally out of frictional engagement with each other, means for placing the elements of the flexible pinion in frictional engagement with each other to cause the winding drum to be rotated, a second flexible pinion mounted on a second shaft and meshing with the spur gear wheel, means for normally maintaining the elements of the second flexible pinion in frictional engagement with each other, pawl and ratchet mechanism for preventing the rotation of the second shaft and the winding drum moving in a reverse direction, and means for releasing the frictional engagement between the elements of the second flexible pinion to permit the winding drum to move in a reverse direction while the retaining ratchet holds the second shaft against rotation.

7. A winch or hoisting apparatus comprising a winding drum rotatively mounted in a frame and provided with a spur gear wheel, a power driven shaft rotatively mounted in the frame, a flexible pinion comprising alternately arranged toothed and friction discs mounted on the shaft and meshing with the spur gear wheel, springs exerting an endwise thrust on the shaft to normally maintain the elements of the flexible pinion out of frictional engagement, a second shaft rotatively mounted in the frame and having a flexible pinion fitted thereto and meshing with the spur gear wheel, a collar and springs for normally maintaining the elements of the second flexible pinion in frictional engagement, a ratchet on the second shaft and pawl on the frame for normally preventing reverse movement of the winding drum, a lever adapted to be actuated in one direction to place the elements of the first flexible pinion in engagement with the first shaft to cause the winding drum to be actuated to wind a rope thereon, and means whereby when the lever is actuated in an opposite direction the elements of the second flexible pinion will be placed out of engagement to permit the winding drum to move in the reverse direction.

8. In winches and hoisting apparatus according to claim 7, a driving pulley fixedly mounted on the first shaft, a collar on the first shaft located on the inside of the flexible pinion mounted thereon, a flanged sleeve located on the outside of the flexible pinion and rotatively mounted in the frame, and tension springs connecting a member on the sleeve to the driving pulley whereby they will exert an inward thrust on the shaft and normally maintain the elements of the said pinion out of frictional engagement.

9. In winches and hoisting apparatus according to claim 7, a collar fixedly mounted on the second shaft on the outside of the flexible pinion mounted thereon, a movable thrust collar on the inside of the second flexible pinion, springs exerting an outward thrust on the movable collar, and a fork engaging the movable collar and connected by rods to a yoke arranged in the path of movement of the operating lever whereby the said lever may be actuated to adjust the thrust collar to relieve the spring pressure on the second flexible pinion to control the reverse movement of the winding drum.

10. In winches and hoisting apparatus according to claim 7, a collar fixedly connected to the inner toothed member of the second flexible pinion, pins on said collars pivotally supporting friction blocks, a member slidably mounted on the second shaft and having an annular flange projecting over the said blocks, inclined faces on the inner end of the said member bearing against corresponding inclined faces on the thrust collar slidably mounted on the shaft, and springs exerting an outward thrust on the said thrust collar constructed and arranged whereby when a reverse movement is imparted to the winding drum the centrifugal force due to the rotation of the inner toothed disc of the flexible pinion will cause the pivotally mounted friction blocks to move outward and frictionally engage the flange on and impart a partial rotation to the slidably mounted member and the inclined faces between the said member and the thrust collar will cause the said member to move inwardly and place the elements of the flexible pinion into frictional engagement and thereby retard or arrest the reverse movement of the winding drum.

11. In winches and hoisting apparatus according to claim 7, a collar fixedly connected to the inner toothed member of the second flexible pinion, pins on the said collar having friction blocks pivotally mounted thereon, a member slidably mounted on the second shaft and having a flange projecting over the said friction blocks, a thrust collar slidably mounted on the second shaft, and a threaded engagement between the thrust collar and the movably mounted member whereby when a partial rotation is imparted to said member due to the frictional contact between the flange thereon and the pivotally mounted friction blocks, the said member will move outwardly and cause the toothed discs of the flexible pinion to be frictionally engaged between the friction discs thereof.

12. In winches and hoisting apparatus according to claim 7, a collar fixedly connected to the inner toothed member of the second flexible pinion, pins on the said collar supporting pivoted friction blocks, a member slidably mounted on the second shaft and having a flange surrounding the said blocks, a thrust collar slidably mounted on the second shaft, a threaded engagement between the thrust collar and the movably mounted member, a spiral spring having one end secured to the thrust collar and the opposite end fixedly or adjustably secured to the flanged member whereby the spring will have a tendency to exert rotational movement to the said member in opposition to the movement imparted thereto by the motion of the pivotally mounted friction blocks bearing against the flange thereof.

13. A winch or hoisting apparatus comprising a winding drum rotatively mounted in a frame and provided with a spur gear wheel, a power driven shaft rotatively mounted in the frame, a pinion mounted rotatively on the shaft and in geared relationship with the spur gear wheel, a clutch for connecting the pinion to the shaft, a second shaft mounted in the frame, a pinion fitted to the second shaft and in geared relationship with the spur gear wheel, a brake drum rotatively mounted on the second shaft, pawls on the brake drum engaging a ratchet wheel fitted to the second shaft, a brake band frictionally engaging the brake drum, and a spring actuated lever for normally maintaining the brake band tightly on the drum.

14. In winches and hoisting apparatus according to claim 13, springs for maintaining the clutch normally out of engagement, and a lever for exerting an end thrust on the shaft to actuate the clutch to place the pinion in fixed relationship with the first shaft.

15. A winch or hoisting apparatus comprising a winding drum rotatively mounted in a frame and provided with a spur gear wheel, a shaft rotatively mounted at one end of the frame of the winch or hoisting apparatus and rotatively mounted at the opposite end in a sleeve rotatively mounted in the other end of the said frame, a pulley fitted to the outer end of the sleeve, a clutch member on the inner end of the sleeve adapted to be placed in engagement with a coacting clutch member fitted to a pinion keyed to the shaft and meshing with the spur wheel gear, a brake drum rotatively mounted on the shaft and having pawls pivoted thereto, a ratchet wheel fitted to the shaft and having its teeth adapted to be engaged by the pawls, a band adapted to be normally maintained pressed hard upon the brake drum, means for actuating the clutch to impart driving motion to the pinion to operate the winding drum, and means for releasing the brake band to permit of a reverse movement of the winding drum.

16. In winches and hoisting apparatus according to claim 7, a thrust collar movably mounted on the second shaft, compression springs pressing the thrust collar against the inner element of the second flexible pinion, screws in a collar fitted to the second shaft and adjustably supporting the compression springs, and members connected to said operating lever for moving the thrust collar in opposition to the thrust of the springs.

17. In winches and hoisting apparatus according to claim 7, a link connected at one end to the said lever and at the opposite end to the frame, said link being disposed at the ends of the first and second shafts and adapted when the lever is operated in one direction to exert an end thrust on the first shaft and when the lever is operated in the opposite direction to impart an end movement to the thrust collar to relieve the frictional engagement between the elements of the second flexible pinion.

18. A winch or hoisting apparatus having a winding drum provided with a spur gear wheel, a combined flexible pinion and friction clutch comprising series of alternately arranged toothed and friction discs, the toothed discs being geared to the spur wheel, a shaft supporting the combined flexible pinion and friction clutch, the toothed discs being rotatively and slidably mounted on the shaft and the friction discs being adapted to rotate with and slide upon the shaft, a second shaft, a combined flexible pinion and friction brake geared to the spur wheel, and comprising series of alternately arranged toothed and friction discs the toothed discs being slidably and rotatively mounted on the second shaft and the friction discs being slidably and non-rotatively mounted thereon, pawl and ratchet mechanism for normally preventing reverse rotation of the shafts and winding drum, means for releasing the frictional engagement between the elements of the combined flexible pinion and friction clutch, and means for controlling the frictional engagement between the elements of the combined flexible pinion and friction brake to govern the reversing movement of the winding drum.

19. In a winch or hoisting apparatus according to claim 18, centrifugally operated members connected to a toothed element of the combined flexible pinion and friction brake, and mechanism actuated by the frictional engagement therewith of the centrifugally operated members to retard and arrest the reversing movement of the drum.

20. In a winch or hoisting apparatus according to claim 18, centrifugally operated members connected to a toothed element of the combined flexible pinion and friction brake, a partially rotatable member on the second shaft, and means for imparting a partial rotation and an endwise movement to the said member to place the elements of the combined flexible pinion and friction brake in frictional contact to retard or arrest the reversing movement of the winding drum.

ALFRED ARTHUR QUICK.